UNITED STATES PATENT OFFICE.

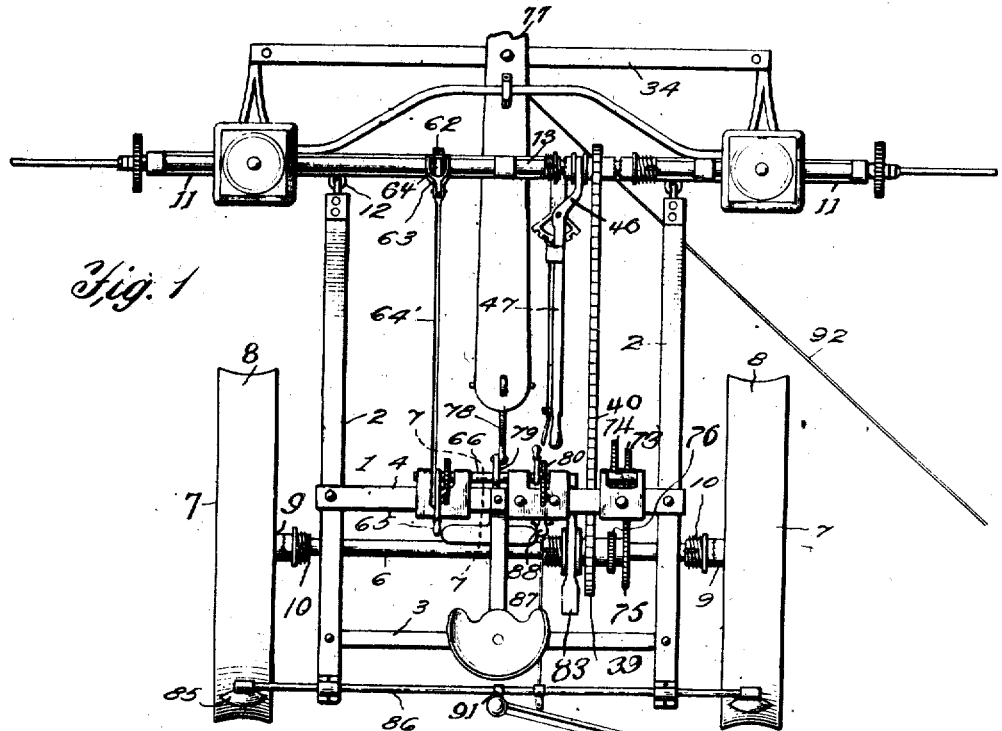

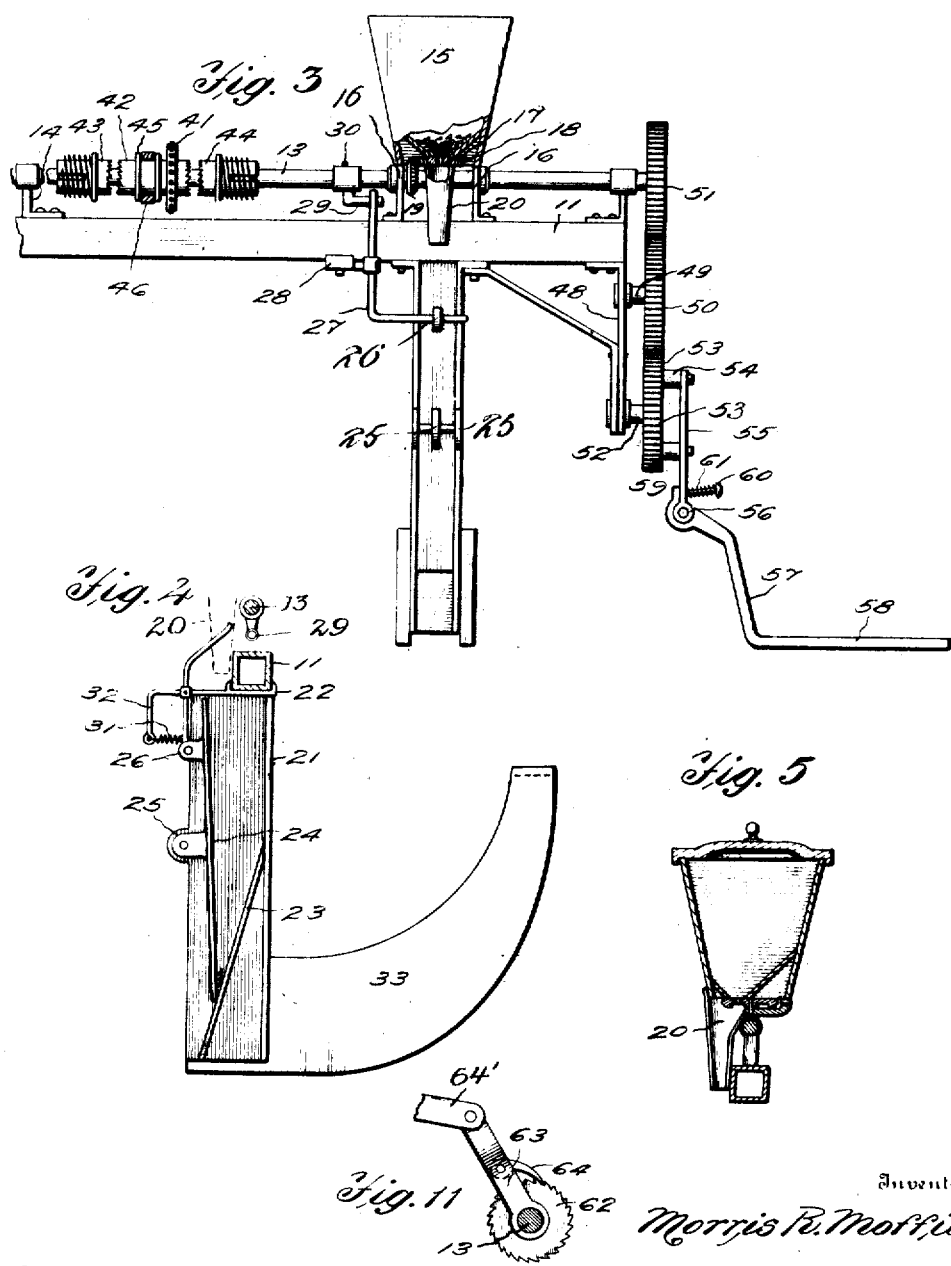

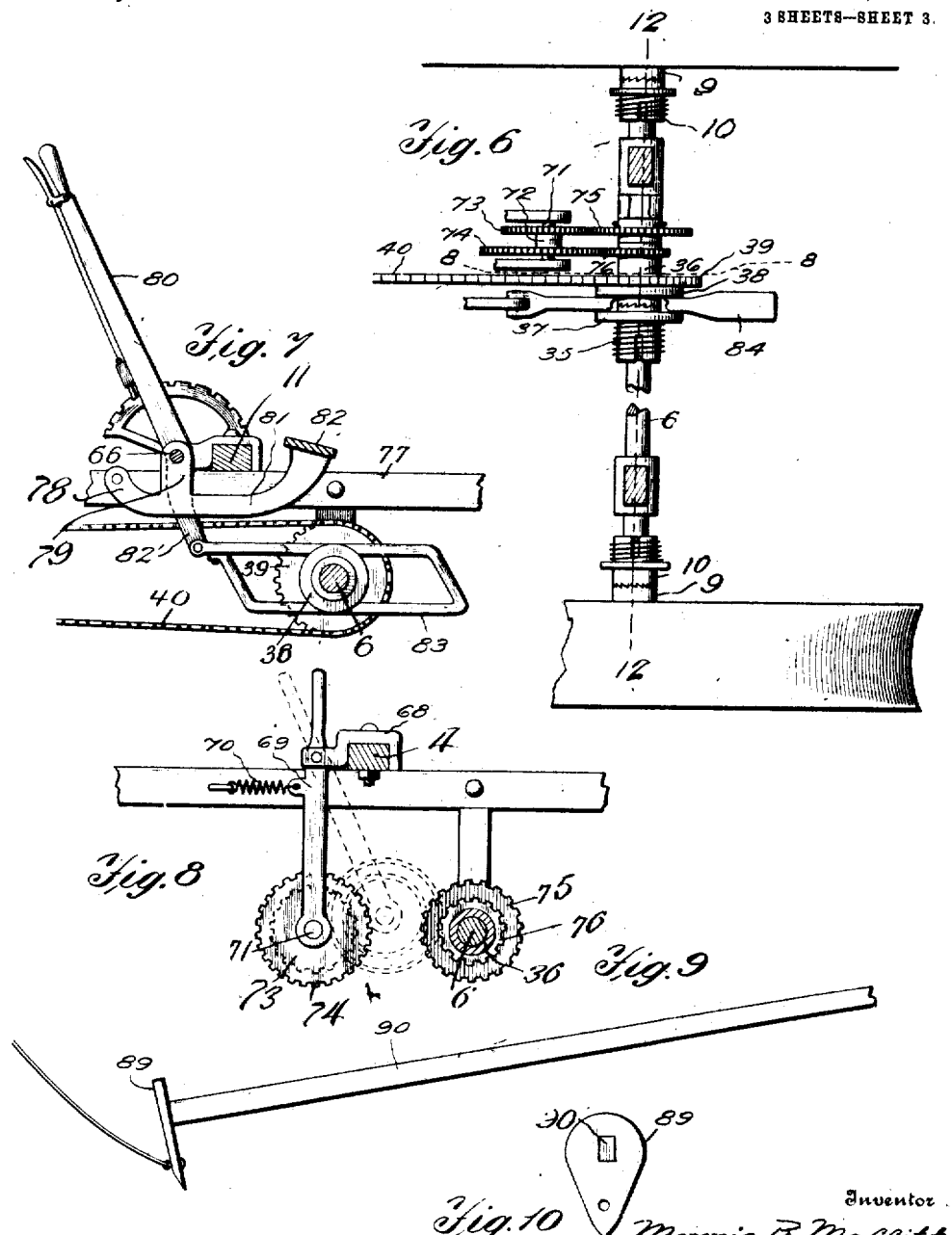

MORRIS R. MOFFITT, OF PECK, KANSAS.

CORN-PLANTER.

No. 914,858.　　　Specification of Letters Patent.　　　Patented March 9, 1909.

Application filed May 25, 1907. Serial No. 375,653.

*To all whom it may concern:*

Be it known that I, MORRIS R. MOFFITT, a citizen of the United States, residing at Peck, in the county of Sedgwick and State of Kansas, have invented new and useful Improvements in Corn-Planters, of which the following is a specification.

The invention relates to an improvement in corn planters in which provision is made for automatically delivering a number of grains of corn at predetermined distances throughout the length of a furrow.

The main object of the invention is the production of means whereby the planting of the corn is automatically performed during the forward travel of the machine, the planting mechanism and operating parts therefor being arranged so that the operator may manually control the interval between the planting operations, whereby the operation of the machine may be controlled to insure even and regular planting throughout the field.

Another object of the invention is the provision of means whereby the operator may manually adjust the corn planting mechanism while the machine is at rest to regulate the delivery in accordance with the rows previously planted, thereby insuring the equally spaced and alined rows desirable in corn planting.

Another object of the invention is the construction of a machine in which the corn planting mechanism is automatically operated in the forward propulsion of the machine, the automatic mechanism being so constructed as to permit manual adjustment during the corn planting operation to insure the planting of any one row with proper regularity and accuracy with respect to the other rows, whereby the machine is wholly complete in itself and the check wire ordinarily employed in corn planters is entirely dispensed with.

With the above objects in view, the invention consists in certain details of construction and combinations of parts which will be fully described in the following specification, reference being had particularly to the accompanying drawings, in which:—

Figure 1 is a plan view of a corn planter constructed in accordance with my invention, Fig. 2 is a side elevation of the same, Fig. 3 is an enlarged elevation partly in section of the operating shaft and corn planting mechanism, Fig. 4 is a vertical sectional view through the delivery tube, Fig. 5 is a vertical sectional view through the seed hopper, Fig. 6 is an enlarged partial section taken just above the drive shaft, Fig. 7 is a section on line 7—7 of Fig. 1, Fig. 8 is a section on line 8—8 of Fig. 6, Fig. 9 is a side elevation of the marker and connected parts, Fig. 10 is a rear elevation of the marking blade, Fig. 11 is a sectional detail showing the manual means for controlling the operating shaft. Fig. 12 is a section on line 12—12 of Fig. 6.

Referring particularly to the drawings, my improved corn planter comprises a frame 1 including side bars 2 connected adjacent their rear ends by a cross bar 3 and in advance of the cross bar 3 by a beam 4 serving to support the manually operable parts of the structure. Between the cross bar 3 and beam 4 the side bars 2 are provided with hangers 5 formed at their lower ends to provide bearings for the drive shaft or axle 6. Each terminal of the drive shaft beyond the respective side bar is provided with a supporting or ground wheel 7, the peripheral or tread surface of which is concaved in transverse section, as shown at 8. Each wheel is mounted upon a sleeve 9 freely revoluble upon the drive shaft and forming one member of a clutch connection, the opposing member 10 of which comprises a sleeve keyed for independent sliding movement on the drive shaft and spring pressed for normal engagement with the sleeve 10. As is usual in clutches of this character the contacting edges of the clutch members are formed with teeth arranged to interlock when the operative clutch member 9 is moving in the forward direction, and to over ride without coöperation when the operative member 9 is driven in the reverse direction. The drive shaft is thus revolved while the machine is traveling in the forward direction, but remains unaffected when the machine is traveling in the rearward direction.

To the relatively forward ends of the side bars 2 of the main frame is connected a forward or runner frame supporting a beam 11, the connection being preferably through coöperating eyes 12 projecting from the beam and side bars, to permit necessary independent movement of the beam. The beam 11 is preferably a hollow boxing to avoid undue weight at the forward end of the machine. An operating shaft 13 is revolubly supported in bearing standards 14 rising from the beam 11, said shaft terminally extending beyond the ends of the beam, for a purpose which will presently appear.

Corn planting mechanism is arranged adjacent each end of the operating shaft, said mechanism being in duplicate to provide for simultaneously planting two spaced rows. Said mechanism comprises a seed hopper 15 supported from the beam 11 by brackets 16, within which hopper is arranged the seed disk 17 formed on its periphery with bevel gear teeth 18 arranged to mesh with a bevel gear 19 on the operating shaft, whereby the seed disk is revolved. The seed disk is formed with appropriately arranged openings designed in the revolution of the disk to receive a grain of seed from the hopper and deliver the same to a discharge chute 20. Immediately beneath the seed hopper is a delivery tube 21, including side walls and a front wall, the tube being suspended from the beam 11 by the supporting plates or bars 22, as shown in Fig. 4. The upper end of the tube is open and arranged to receive the seed delivered through the chute 20, and is provided at its lower end with a bottom 23 which inclines from the forward wall rearwardly to a position slightly in advance of the rear edges of the side wall. A gate 24 is mounted in the delivery tube being pivotally supported at a point about midway its length in ears 25 projecting from the rear edges of the side walls of the tube. At the relatively upper end, or adjacent thereto, the gate is provided with a rearwardly extending ear 26 formed with an opening to receive one arm of an L-shaped lever 27 pivotally supported at 28 on the beam, the upper end of the lever projecting above the beam and being normally disposed in the path of a trip 29 adjustably secured on the operating shaft through the medium of a set screw 30. The lower end of the gate is normally in contact with the inclined bottom 23 of the tube, being maintained in this position by a coil spring 31 connecting the relatively upper end of the gate and a bracket arm 32 projecting from the supporting plate 22.

The relatively upper end of the lever 27 will, in the revolution of the operating shaft, be engaged by the trip 29 with the effect to rock the gate on its pivotal support and move the lower end of said gate from contact with the bottom 23 of the tube. The parts are so arranged that in the operation of the shaft 13 the seed disk will deliver through the chute 20 a certain number of grains of corn between the operations of the trip 29. The grains so delivered will lodge between the gate and tube bottom and be retained in such position until the trip 29 operates the gate, whereupon the collected seed will be simultaneously delivered for a single hill or planting. Runners or furrow openers 33 in pairs are secured to the respective side walls of the tube, projecting therefrom in a forwardly direction, the runners of each pair inclining toward each other and being of arcuate shape in elevation. The runners project slightly below the lower end of the tube and the forward ends of each pair of runners are joined by a cross bar 34. The runners serve to open a furrow immediately in advance of the tube for the reception of the corn. In this connection it will be noted that the concaved formation of the tread surfaces of the ground wheels will operate to close the ground over the deposited corn, it being noted that said wheels travel directly in the line of furrow formed by the runners.

Secured upon the drive shaft is a clutch mechanism comprising an independently slidable sleeve 35 keyed upon the shaft and a gear sleeve 36 loose upon the shaft. The contacting edges of the respective sleeves are arranged for usual toothed engagement, the sleeve 35 adjacent its operative end being formed with a disk 37 and the sleeve 36 being formed with a similar disk 38 arranged in spaced parallel relation with the disk 37 which will presently appear. The disk 38 is preferably formed integral or provided with a sprocket 39 adapted to engage and operate a sprocket chain 40 extending to a sprocket 41 fixed upon a sleeve 42 loosely mounted upon the operating shaft 13. Beyond each end of the sleeve 42 is arranged a clutch sleeve 43, 44, each of which is adapted for independent sliding connection with the shaft and is spring pressed toward the sleeve 42. The ends of the sleeve 42, and the proximate ends of the sleeves 43 and 44 respectively are formed with coöperating clutch teeth, so that said sleeve 42 is in effect a clutch member arranged for independent engagement with either clutch sleeve 43 or 44. The sleeve 42 is formed with spaced annular ribs or collars 45 in which is seated a yoke end 46 of a lever 47 mounted upon an arm projecting from the beam 11 and extending rearwardly within reach of the operator. By manipulation of the lever 47, the sleeve 42 may be engaged with either clutch sleeve 43 or 44 or may be held between said clutch sleeves in coöperation with the lever out of contact with sleeves 43 or 44.

Depending from each end of the beam 11 is a hanger strip 48 in which is rotatably mounted a stub shaft 49 carrying a gear 50 arranged to mesh with and be driven by a gear 51 secured upon the end of the operating shaft 13. Below the stub shaft 49 a second stub shaft 52 is mounted in the hanger 48, on which is mounted a gear 53 arranged to mesh with the gear 50, and carrying projecting studs 54 on which is fixed an arm 55 carrying at its lower end a hinge connection 56. Secured to the arm 55, through the medium of the hinge connection, is a marker 57, having a marking section 58 extending in parallel relation to the operating shaft, as shown. Beyond the hinge connection 56 the marker 57 is formed with a projection 59 carrying a pin 60 projecting through an opening in the arm 55, a coil spring 61 encircling the pin between its head and the proximate surface of the arm 55. Through the medium of the spring and pin, the marker may yield in one direction independently of the movement of the arm 55, whereby provision is made for the automatic accommodation of the arm to obstructions in the surface with which the marker engages, such as stones or the like.

The respective gears are so arranged that as the trip 29 operates to open the gate 24 to feed the accumulated seed, the marker 58 will engage and form a depression or mark in the ground, thereby indicating the exact line of planting, and permitting the operator during the next row planting to gage the operation of the machine in accord with the marks already made, thereby alining the rows planted.

It is, of course, obvious that after planting a double row by a single trip of the machine through the field, the next trip, as well as all subsequent trips must deposit the seed in alinement with that of the first row. As in the forward propulsion of the machine the marker, as well as the automatic planting operation occurs with absolute uniformity and regularity, there must be provided some means by which the planting mechanism and marker may be adjusted when the machine is ready for each particular trip across the field so as to insure the planting operation in alinement with the hills of the previous row. To this end I have devised a means by which the operating shaft may be adjusted independently to advance or retard the planting operation in the initial planting at the end of a row, so that all subsequent plantings in that row will aline with the plantings of the previous rows. To this end I secure upon the operating shaft a ratchet 62 and loosely secure upon the shaft, adjacent the ratchet and on opposite sides thereof, the spaced arms of a bracket 63, between which arms is mounted a pawl 64 arranged to mesh with the teeth of the ratchet. The end of the bracket 63 is connected by a rod 64' to a lever 65 mounted on the cross beam 4, preferably upon a shaft 66 supported in bearing plates secured to the beam. The lever is thus arranged within convenient reach of the operator, so that when desired the rod 64' may be reciprocated with the effect to cause the pawl 64 to engage the ratchet 62 and thereby advance the operating shaft manually to cause the next feeding operation to aline with the planting of the previous row.

I have also devised a means by which the advancing of the operating shaft beyond the normal speed may be accomplished during the forward propulsion of the machine, so that the operator may adjust the operation at any time during the travel of the machine. To this end I secure upon the beam 4 in alinement with the sleeve 36, a bracket 68 in which is pivotally mounted a lever 69 normally held in retracted position by a spring 70. On the lower end of the lever is carried a shaft 71 on which is mounted a sleeve 72 carrying spaced gears 73 and 74. The gears 73 and 74 are arranged in alinement respectively with the gears 75 and 76, secured respectively on the drive shaft 6 and on the sleeve 36. Of the respective pairs of gears, the gear 75, is arranged to mesh with the gear 73, and the gear 74, arranged to mesh with the gear 76 are of materially greater diameter than the remaining gears of the pairs, so that when the parts are in coöperation through proper movement of the lever 69 the sleeve 36, from which the sprocket chain 40 is operated, will be driven through gear 75, gear 73, sleeve 72, gear 74, and gear 76. As the gears 73 and 76 are of smaller diameter than the remaining gears, an accelerated movement will be imparted to the sleeve 36 with the effect to increase the speed of travel of the chain over the normal, and thus decrease the intervals between the planting operations.

It is, of course, understood that the use of the accelerated driving means described is designed to momentarily increase the speed of the operating shaft with the effect to cause the planting operations to vary in order to permit the machine to catch up in point of alinement with the hills of the previous row, and that such accelerated movement will be continued as long as the operator maintains pressure upon the handle end of the lever 69. Upon the release of this pressure the spring 70 will operate to disengage the gears, referred to, permitting the chain 40 to be again operated through the clutch 35, as will be understood.

A draft beam 77 extends beneath the supporting beam 11 and is connected to the cross bar 34 joining the runners, the forward end of the beam may carry a doubletree and coöperating parts for the attachment of the draft animals. The relatively rear end of the draft beam is connected by a link 78 to an arm 79 fixed on the shaft 66, a lever 80 being mounted for rotating the shaft when desired. In connection with the lever I secure upon the shaft 66 a pressure bar 81, the relatively rear end of which is provided with a foot plate 82 arranged within convenient reach of the feet of the operator, so that when desired the operator may by pressing upon the foot plate and pulling upon the lever, elevate the relatively rear end of the draft beam and thereby lift the front or runner frame carrying the planting mechanism free of the ground.

As the described elevation of the frame carrying the planting mechanism is to be desired when moving the machine to or from the field or when turning at the end of a row, it is obvious that in connection with such elevation means should be employed for simultaneously preventing transmission of power to the operating shaft. This is accomplished by providing the lever 80 with a depending arm 82' to which is connected a rectangular frame member 83, the upper and lower bars of which are materially widened at their relatively forward ends, as at 84. The upper and lower bars of the frame 83 are normally disposed between the disks 37 and 38 of the sleeves 35 and 36 on the drive shaft, above and below said shaft. Therefore, as the lever 80 is operated to elevate the frame carrying the planting mechanism the frame 83 will be moved longitudinally with respect to the drive shaft and cause the widened portions 84 of said frame to separate the disks 37 and 38 and thereby disengage the clutch teeth on the proximate ends of the sleeves 35 and 36. The rotation of the drive shaft will, therefore, not affect the sleeve 36 and the drive chain 40 will remain at rest until operation of the lever 80 in the reverse direction.

In operation, assuming the parts constructed and arranged as described, the forward propulsion of the machine serves to actuate the planting mechanism in the manner described with the effect to deposit a definite number of seed in spaced hills, and to mark the relative positions of said hills as a gage to the planting operation of the next row. After having completed the row the operator will turn the machine for the planting of the next row, at the same time elevating the operating parts and automatically disconnecting the drive shaft from the operating shaft in the manner described. When the machine is in position for planting the next row, the operator, through the use of the lever 65, may manually operate the shaft 13 to so adjust the parts that the initial planting in the row about to be planted will aline with the last planting of the previously planted row. During the planting of any one row, if it is discovered that through any irregularity in the surface the alinement with the previous hills is not regular, the operator may readily retard or accelerate the movement of the operating shaft to decrease or increase the movement of said shaft until the machine has again been adjusted to alinement. In retarding the movement of the shaft the lever 47 is moved from side to side to cause the sleeve 42 to be moved longitudinally of the operating shaft and engage the first or second clutch sleeve 43 or 44. During the reciprocation the sleeve 42 is free from either clutch sleeve, hence the operating shaft is not affected by the drive chain 40, and its movement is retarded as desired. Through operation of the lever 69 and connected parts the movement of the operating shaft may be accelerated in the manner previously described. The operator is thus given absolute control of the machine and may initially adjust the operating shaft, or retard or accelerate its movement during travel to adjust the planting operations to insure absolute uniformity and alinement of the planted hills.

In connection with the machine described I contemplate the use of a scraper 85 for each ground wheel, mounted upon a shaft 86 supported in the relatively rear ends of the sidebars 2 of the main frame and operated through a rod 87 leading to a lever 88. A line marker 89, of approximately triangular shape in rear elevation is supported upon a rod 90 pivotally mounted on an arm 91 depending from the shaft 86, said marker being connected to the draft beam by a tie bar 92, and serving to provide a line longitudinally of the field beyond the plane of operation of the machine for use as a gage in the return travel of the machine to insure even planting. When the operator reaches the end of the field and turns the machine the marker is raised up and dropped after the machine is in position to plant the next row. The driver's seat 93 is preferably supported upon braces 94 rising from the cross bar 3 and cross beam 4, the respective levers hereinbefore referred to being arranged within convenient reach of the operator from the seat.

While preferring the details of construction herein shown and described it is to be understood that I do not desire to limit myself exactly thereto, but contemplate as within the spirit of my invention such variations and modifications of the construction described as may fall within the scope of the appended claims.

Having thus described the invention what is claimed as new, is:—

1. A corn planter including a main frame, a drive shaft mounted thereon, means for operating the drive shaft in the travel of the planter, an operating shaft supported on the front frame, means for actuating the operating shaft from the drive shaft, duplicate corn planting mechanisms actuated in the movement of the operating shaft, auxiliary frames depending from the front frame adjacent the end of the operating shaft, intermeshing gears carried by each auxiliary frame, a marker carried by one of said gears, and a gear carried by the end of the operating shaft and serving to drive the intermeshing gears.

2. A corn planter including a main frame, a drive shaft mounted thereon, means for operating the drive shaft in the travel of the planter, an operating shaft supported on the front frame, means for actuating the operating shaft from the drive shaft, duplicate corn planting mechanisms actuated in the movement of the operating shaft, auxiliary frames depending from the main frame adjacent the end of the operating shaft, intermeshing gears carried by each auxiliary frame, a marker carried by one of said gears, and a gear carried by the end of the operating shaft and serving to drive the intermeshing gears, said marker being adapted for independent movement relative to its supporting gear in one direction.

3. A corn planter including a main frame, a drive shaft operated in the travel of the planter, an operating shaft supported on the frame in advance of the drive shaft, a clutch sleeve loose upon the operating shaft, duplicate clutch sleeves slidably mounted upon the drive shaft and adapted to be engaged by the opposing ends of the loose clutch sleeve, a sprocket wheel secured upon the loose clutch sleeve, a drive chain engaging said wheel and operated by the drive shaft, and means for manually adjusting the loose clutch sleeve with respect to the sliding clutch sleeve, whereby the movement of the operating shaft may be retarded without affecting the movement of the drive chain.

4. A corn planter including a main frame, a drive shaft supported thereby, means for operating said shaft in the forward travel of the planter, an operating shaft supported by the front frame in advance of the drive shaft, a clutch sleeve loose upon the drive shaft, a clutching element fixed on the drive shaft against independent revoluble movement and adapted to normally engage the clutch sleeve, a sprocket wheel carried by the sleeve, a power chain engaging said wheel and in turn actuating the operating shaft, a gear fixed upon the clutch sleeve, a gear fixed upon the drive shaft, and a manually operable train of gears adapted to be engaged with the drive gear and sleeve gear, said respective gears being arranged to accelerate the movement of the sprocket wheel beyond that of the drive shaft when the gears are in meshing relation.

5. A corn planter including planting mechanism, means for operating said mechanism during the travel of the planter, and pivotally mounted means arranged for bodily movement to and from the operating means, said pivotally mounted means being in one position actuated by the operating means and in turn actuating the planting mechanism, said latter means varying the movement of the planting mechanism from that resulting directly from the operating means.

6. A corn planter including planting mechanism, means for normally actuating said mechanism, and manually operable pivotally mounted means movable to and from the actuating means and arranged between the actuating means and the planting mechanism, whereby said planting mechanism will be driven by the actuating means through the pivotally mounted means but at a speed varying from the normal.

7. A corn planter including planting mechanism, means for operating said mechanism during the travel of the planter, and means pivotally supported for bodily movement to and from the operating means and arranged to be manually interposed in the operating means to cause the travel of the planter to vary the speed of the planting mechanism from the normal.

8. A corn planter including a drive shaft, planting mechanism, and means whereby said shaft will operate the mechanism, in combination with a pivotally mounted gear train arranged for bodily movement to and from the operating means, said gear train being adapted to be interposed between said drive shaft and operating means, whereby to vary the speed of the planting mechanism from that normally induced in the operation of the drive shaft.

9. A corn planter including a drive shaft, planting mechanism, a drive chain for said mechanism having clutch connection with the drive shaft, and a gear train pivotally supported for bodily movement to and from the drive shaft, said gear train being arranged to be manually interposed between the drive shaft and clutch connection of the drive chain, whereby said chain is driven from the drive shaft at a speed varying from its normal speed.

10. A corn planter including planting mechanism, a drive shaft, coöperating clutch members mounted on the drive shaft, a drive chain operated by one of said clutch members for actuating the planting mechanism, a gear carried by said clutch member, a second gear operated directly by the drive shaft, and a pivotally mounted section carrying gears to intermesh with the clutch gear and drive shaft gear, whereby the chain may be operated directly from the drive shaft or through said gears.

In testimony whereof, I affix my signature in presence of two witnesses.

MORRIS R. MOFFITT.

Witnesses:
  W. L. LANE,
  ELLA SCUDDER.